June 21, 1927.
J. B. STRAUSS
1,633,141
CONCRETE VEHICLE BODY
Filed April 20, 1918
2 Sheets-Sheet 1
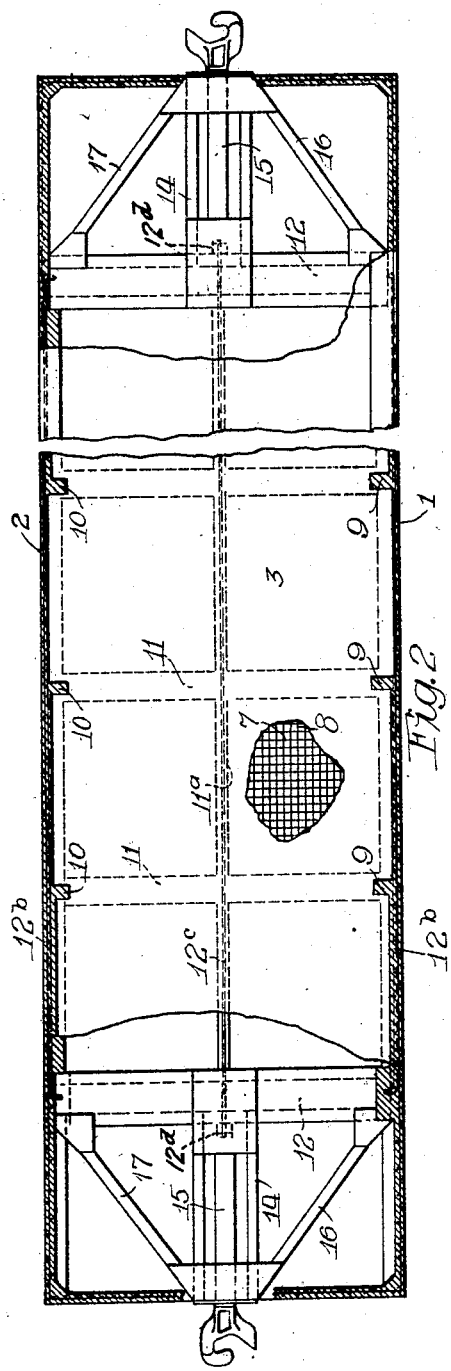
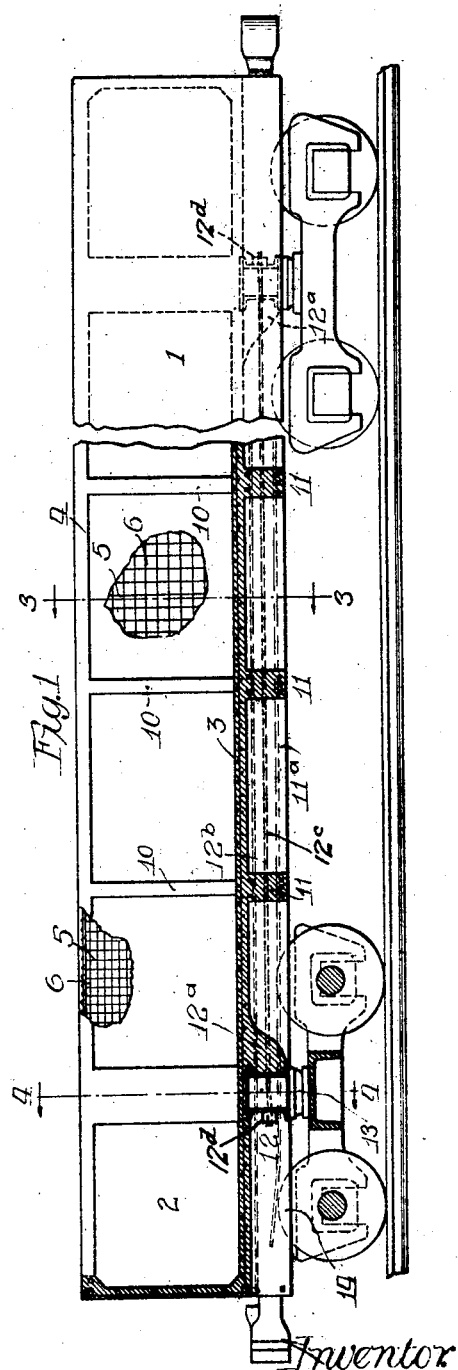

June 21, 1927.

J. B. STRAUSS 1,633,141

CONCRETE VEHICLE BODY

Filed April 20, 1918

Witness:
Chas. R. Koursh.

Inventor
Joseph B. Strauss.
By: Parker Carter Attys.

Patented June 21, 1927.

1,633,141

UNITED STATES PATENT OFFICE.

JOSEPH B. STRAUSS, OF CHICAGO, ILLINOIS, ASSIGNOR OF ONE-HALF TO CHARLES WEINFELD, OF CHICAGO, ILLINOIS.

CONCRETE VEHICLE BODY.

Application filed April 20, 1918. Serial No. 229,711.

This invention relates to improvements in concrete vehicles and has among other objects to provide a vehicle such as a railway car made out of reinforced concrete which can be manufactured quickly and in unlimited quantities at a comparatively low first cost and which requires but limited maintenance expense when in operation.

The invention is illustrated in the accompanying drawings wherein,

Fig. 1 is a view of a concrete vehicle body embodying the invention;

Fig. 2 is a plan view in part section;

Like numerals refer to like parts throughout the several figures.

Figure 3:
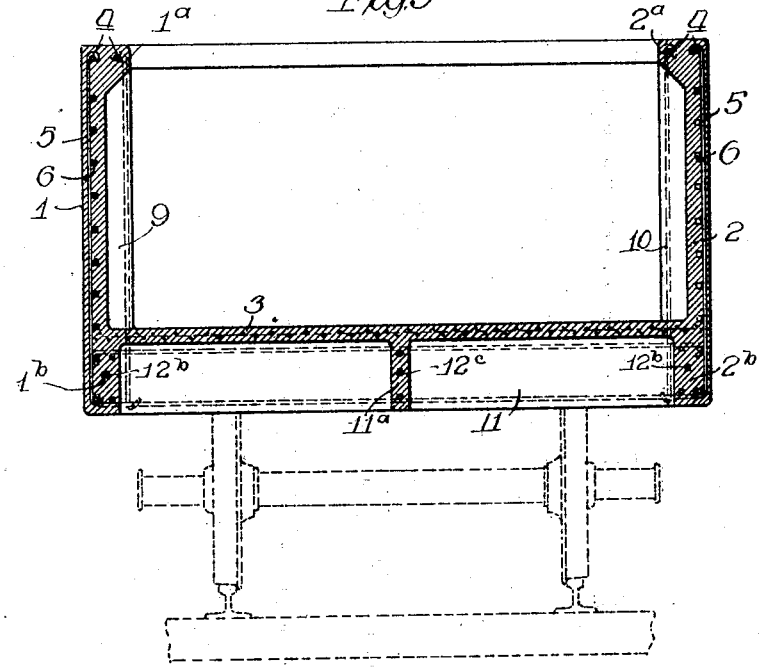
Fig. 3 is a sectional view taken on line 3—3 of Fig. 1.
Figure 4:
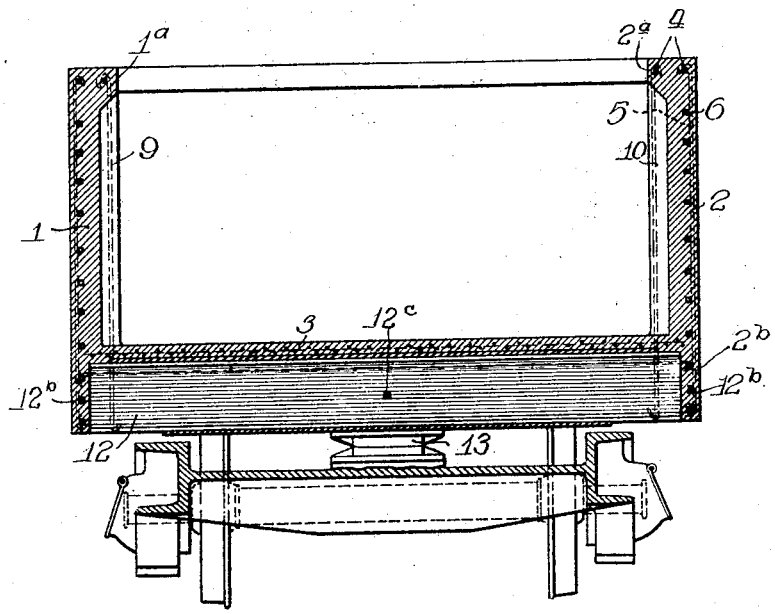
Fig. 4 is a sectional view taken on line 4—4 of Fig. 1 the center bearing not being sectioned.

In carrying out my invention I provide a vehicle body consisting of side walls 1 and 2 and floor 3, said side walls and floor made of concrete and forming a unitary structure, the side walls acting as girders, and the side walls and floor also acting as a unitary girder supported on the trucks, the body being connected with and supported on said trucks at the longitudinal center line of the floor. The side walls and floor are provided with suitable reinforcing metal such as steel rods and the like. I prefer to provide the upper edges of the walls 1 and 2 with enlargements 1ª and 2ª forming as it were flanges. These flanges are preferably provided with reinforcing longitudinal rods 4. The side walls are preferably provided with reinforcing metal pieces 5 and 6. As illustrated, these reinforcing members are divided into two sets at an angle to each other, but if desired I may use only one set of these reinforcing members. The floor 3 may also be provided with similar reinforcing members 7 and 8. I have simply broken away a part of the wall and a part of the floor to show a portion of these members. The reinforcing members 5, 6, 7 and 8 may be connected together in any desired manner as by having the cross members hooked into the longitudinal members as illustrated.

The bottom portions of the walls 1 and 2 are also provided with enlargements 1ᵇ and 2ᵇ. The walls 1 and 2 are also preferably provided at intervals with ribs 9 and 10 integral therewith and extending between the top and bottom enlarged portions. I also provide a plurality of ribs 11 integral with the floor and located under such floor and extending across and connecting with the portions of the walls which project below the floor, the whole structure forming a unitary self-sustaining structure. Metal reinforcing members are embedded in the ribs and are preferably connected to and form a part of the main metal reinforcing framework. There is also a central rib 11ª extending longitudinally of the car body. These various ribs form beams integral with the floor and sides or walls of the car. This metal reinforcement forms as it were a metal or steel skeleton frame for the car body. The enlargement or flanges at the top and bottom of the walls form girders as it were on the walls. Some suitable means is provided for connecting the car body to the trucks.

In the construction shown there are embedded steel members 12 properly positioned to which are connected the center bearings 13 by means of which the body is pivotally connected with the trucks. Some means is also provided for properly transmitting the draw bar pull into the body of the car. This may be done by means of the metal members 14 at the ends of the car and which are preferably connected with the members 12. The draw bar 15 is connected with the member 14. I may also provide at each end the members 16 and 17 which are connected with the members 12 and 14 (see Fig. 2) and which form a rigid triangular construction for transmitting the strains of the draw bar into the body of the car.

It will thus be seen that I provide a unitary self-sustaining structure from truck to truck.

I prefer to provide projecting ledges 12ª of concrete abutting and enclosing the members 12 to absorb the forces they transmit. These ledges project from the body of the concrete as shown in Fig. 1 and extend across the car body below the floor. The imbedded members 12 are also preferably tied together by the rods 12$^b$ in the side walls and the rod 12$^c$ in the central rib. These rods are connected to the two members 12 in any desired manner as by means of nuts 12$^d$. The side walls are also thickened at the points where the members 12 are located. Such side walls for example may be made thicker at the portions adjacent the imbedded members 12 and such thickened portions extend a portion of the way along the wall, as for example from the imbedded members 12 to the adjacent ribs projecting inwardly from the walls. These thickened portions properly take care of the stresses.

A greater amount of reinforcing metal is also provided at these thickened portions both in the walls and the floor due to the fact that they take the greater strains.

I claim:—

1. A concrete car body comprising a reinforced concrete floor, longitudinal and transverse concrete beams integral with said floor, metal members at the ends of the car for transmitting the draw bar pull into the floor and walls thereof and connecting parts on said members for connecting the car body to the trucks the whole forming a unitary self-sustaining structure from truck to truck.

2. A concrete car comprising a reinforced concrete floor, reinforced concrete walls integal therewith, said walls provided with enlarged portions at the top and bottom, ribs integral with said walls and extending between the top and bottom enlarged portions thereof, ribs integral with said floor extending under the floor and between the bottom enlarged portions of said walls, metal members at the ends for transmitting the draw bar pull into the floor and walls and means connected with said members for attaching the car trucks thereto the whole forming a unitary self-sustaining structure from truck to truck.

3. A car comprising concrete walls and a concrete floor, a main metal skeleton framework associated therewith comprising longitudinal members at the top and bottom of the walls, transverse wall and floor members connected to said longitudinal members, the top and bottom of said walls being enlarged to form flanges, ribs extending between said flanges on the walls, ribs projecting from the under side of the floor, metal reinforcement in said ribs connected to and forming a part of the main metal framework, the whole forming a unitary self-sustaining reinforced concrete car body.

4. A car comprising concrete walls a concrete floor, a main metal skeleton framework associated therewith comprising longitudinal main members at the top and bottom of the walls, transverse wall and floor members connected to said longitudinal members, the top and bottom of the walls being enlarged to form flanges, ribs extending between said flanges on the walls, ribs under the floor, metal reinforcement in said ribs connected to and forming a part of the main metal framework, metal members near the ends of the floor for transmitting the draw bar pull into the car body, the longitudinal main members of the metal skeleton frame being connected to said draw bar pull transmitting members, and means connected with said latter members for attaching the trucks thereto, the whole forming a unitary self-contained structure from truck to truck.

5. A car comprising a concrete body having to side walls and a floor system, the side walls provided at the top with projecting flanges, said side walls forming girders integral with the floor system for taking part of the load.

6. A car comprising concrete walls and a concrete floor, a main metal skeleton framework associated therewith comprising longitudinal members at the top and bottom of the walls, transverse wall and floor members connected to said longitudinal members the top of said walls being enlarged to form flanges, ribs extending between said flanges on the walls, the whole forming a unitary self-sustaining reinforced concrete car body.

7. A car comprising reinforced concrete walls, a reinforced concrete floor and members interlocked with said floor at the ends thereof for transmitting the draw bar pull into the floor and thence into the walls.

8. A car comprising a unitary reinforced concrete body, metal members interlocked with said body at separated points and means for connecting said interlocked members with the car trucks.

9. A car comprising a unitary reinforced concrete body, metal members interlocked with said body at separated points, means for connecting said interlocked members with the car trucks, and draw bar connections to said members.

10. A car comprising a unitary reinforced concrete body, metal cross members interlocked with said body at separated points, means for concentrating the loads upon the said interlocked cross members and a connection between said cross members and the car trucks.

11. A car comprising concrete walls, enlarged portions at the upper end of said walls, said enlarged portions having a plurality of substantially parallel reinforcing members embedded therein, a concrete floor integral therewith, longitudinal reinforcing members imbedded in said wall and floor and transverse reinforcing members imbedded in said wall and said floor, said transverse reinforcing members connected with said longitudinal members in said floor, walls and enlarged portions so as to form a metal framework imbedded in the concrete.

12. A car comprising reinforced concrete walls, inwardly projecting thickened portions at the top of said walls, a floor connecting said walls and integral therewith, portions of said walls projecting below the floor, ribs integral with said floor and connecting the portions of the wall projecting below the floor.

13. A car comprising reinforced concrete walls, inwardly projecting thickened portions at the top of said walls, a floor connecting said walls and integral therewith, portions of said walls projecting below the floor, ribs integral with said floor and connecting the portions of the wall projecting below the floor, and a central longitudinal rib on the bottom of said floor.

14. A car comprising concrete walls and a reinforced concrete floor integral therewith, the upper portion of each of said walls being enlarged to form a flange and a plurality of ribs integral with said walls and connecting said flanges and the floor.

15. A car comprising a reinforced concrete body, trucks on which said body is mounted, said body being self-sustaining between the trucks, portions of said body formed into girders to concentrate the loads and distribute them to the trucks, and ribs integral with the body portion and the girders to stiffen them.

16. A car comprising a self-sustaining reinforced concrete body portion mounted on trucks, a central longitudinal girder under said body portion and draw bar connections to said central longitudinal girder and means for connecting the car body to the trucks.

17. A car comprising a self-sustaining reinforced concrete body, trucks therefor, metal members at the ends of said body for the transfer of the draw bar pull into the body and for connecting the body to the trucks and projecting ledges on said body abutting the metal members so as to absorb forces they transmit.

18. A car comprising a reinforced concrete body, trucks on which the body is mounted, said body self-sustaining between the trucks, members at the ends of the body for transferring the draw bar pull into the body and for connecting the body to the trucks, said body provided with integral side walls acting as girders between said members at the ends of the body, said side walls thicker at the portions adjacent the said members than at other portions thereof.

19. A car comprising a self-sustaining reinforced concrete body, trucks upon which the body is mounted, longitudinal girders formed integral with the floor of said body, metal members near the ends of said floor for the transfer of the draw bar pull into the body and for connecting the body to the trucks, and metal rods embedded in said longitudinal girders, said rods directly connecting the said metal members together.

20. A car comprising a concrete body made up of bottom and side walls forming an integral construction, reinforcing metal embedded in said body and side walls, members near the ends of said body for transferring the draw bar pull into the body and for connecting the body to the trucks, the side walls thicker adjacent the said members than at other portions thereof, said thickened portions of the side walls containing a greater quantity of imbedded reinforcing metal than the remaining portions thereof.

21. A reinforced concrete railway car having girders and cross beams formed integral with the floor of the car, and reinforcements extending continuously from the floor into the cross beams.

22. A reinforced concrete railway car having girders and cross beams formed integral with the floor and sides of the car, and reinforcements extending continuously from the floor into the cross beams and into the sides.

23. A reinforced concrete railway car having girders and cross beams formed integral with the floor of the car, and reinforcements extending continuously from the cross beams into the girders.

24. A concrete car body having sides with panels and vertical thickened or post-like portions between the panels, all made integral and of concrete.

25. A car comprising concrete walls and a reinforced concrete floor integral therewith, the upper portion of each of said walls being enlarged to form a flange and a plurality of ribs integral with said walls and connecting said flanges and the floor.

26. A car comprising a reinforced concrete body, trucks on which said body is mounted, said body being self-sustaining between the trucks, portions of said body formed into girders to concentrate the loads and distribute them to the trucks, and ribs integral with the body portion and the girders to stiffen them.

27. A reinforced concrete car body having the bottom and side integral and a bolster imbedded in said bottom.

28. A concrete railway car having a bolster, and also having girders, a floor and cross beams integral, said cross beams transmitting pressure from the floor to the bolster through the girders.

29. A concrete car comprising a self-sustaining, reinforced, integral, concrete body portion mounted on trucks, a central longitudinal girder under said body portion and draw bar connections to said central longitudinal girder and means for connecting the integral car body to the trucks.

30. A car body construction comprising a frame, consisting of longitudinal sills and transverse members of reinforced concrete and a floor carried by said frame, said floor also being constructed of reinforced concrete.

In testimony whereof, I affix my signature.

JOSEPH B. STRAUSS.